UNITED STATES PATENT OFFICE.

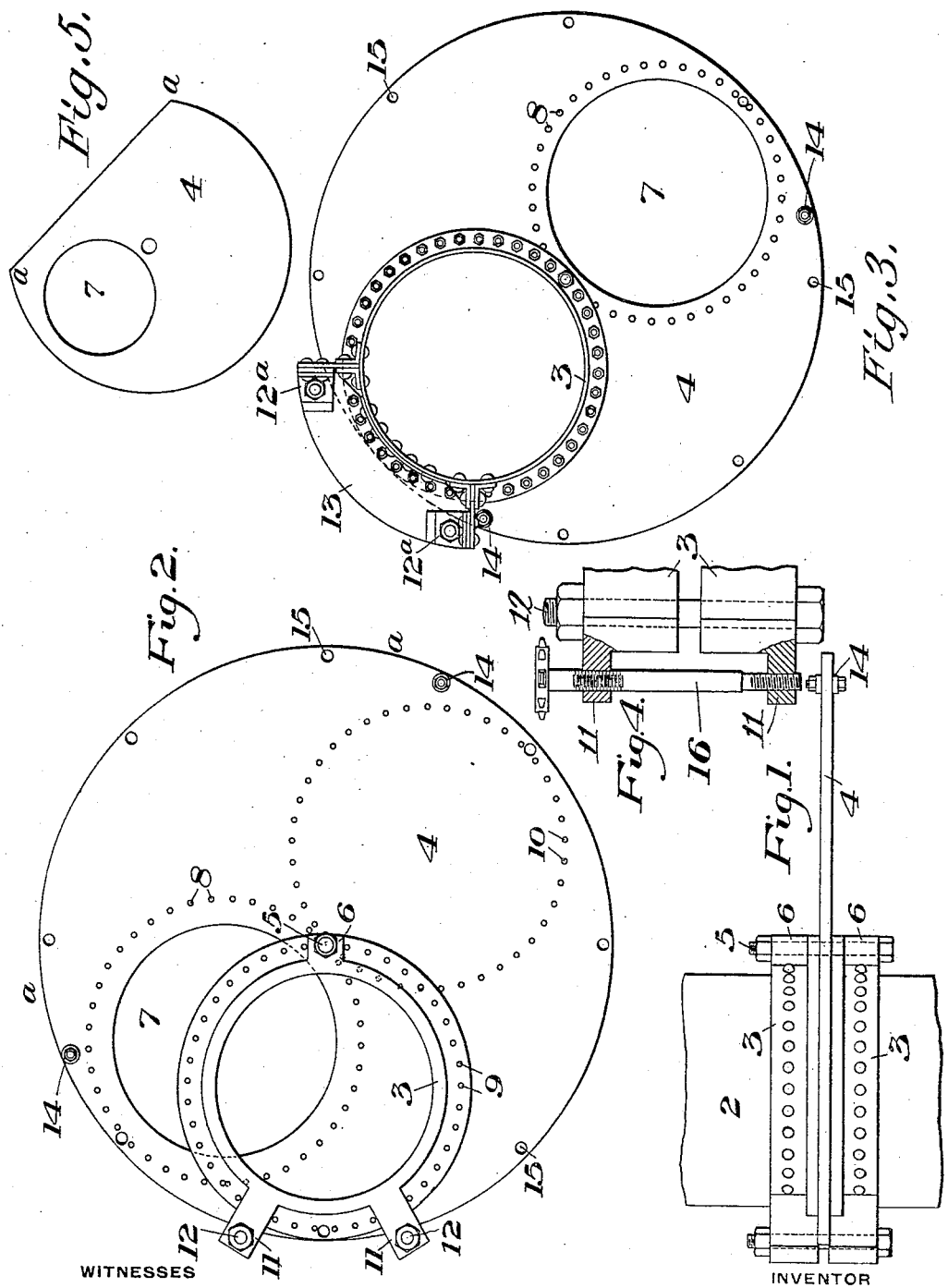

LEONARD SHAW, OF CHICAGO, ILLINOIS.

GOGGLE-VALVE FOR GAS-MAINS.

No. 931,506.  Specification of Letters Patent.  Patented Aug. 17, 1909.

Application filed September 14, 1908. Serial No. 452,843.

*To all whom it may concern:*

Be it known that I, LEONARD SHAW, of Chicago, Cook county, Illinois, have invented a new and useful Goggle-Valve for Gas-Mains, of which the following is a full, clear, and exact description, reference being had to the accompanying drawings, forming part of this specification, in which—

Figure 1 is a plan view showing one of my improved valves applied to a gas main; Fig. 2 is an enlarged view of the valve and one of the flanges, showing the valve being moved from one position to the other; and Fig. 3 is a view showing the same parts as Fig. 2, but with a different form of flange; and Fig. 4 is a detail view showing modified means for separating the flanges; Fig. 5 is a detail view of the valve with a portion of the edge removed.

My invention has relation to goggle valves for gas mains, and is designed to provide a simple and efficient form of valve of this character.

The precise nature of my invention will be best understood by reference to the accompanying drawings, which will now be described, it being premised, however, that various changes may be made in the details of construction and arrangement without departing from the spirit and scope of my invention as defined in the appended claims.

In these drawings, the numeral 2 designates a gas main, to which my improved valve is shown as applied. The main is divided to receive the valve, and to each of the pipe ends is riveted or otherwise rigidly secured, a ring or flange 3.

4 designates the valve, which may consist of a circle plate as shown. One edge portion of this plate may, however, be removed as shown in Fig. 5, if desired, the only material effect being to decrease the stiffness of the plate and cut out the possible desirability of this portion of the plate in the operation of the valve. This plate or disk is interposed between the two flanges 3, and is centrally pivoted by a bolt or pin 5 passing therethrough and seated in lugs or bearings 6 of the rings or flanges 3. The valve is formed with an eccentrically located circular opening 7, which is of the same diameter as the interior diameter of the gas main, and which is in alinement therewith when the valve is in its opened position. Surrounding this opening are a series of bolt holes 8, which are designed to be in alinement with a similar series of holes 9 in the rings or flanges 3 when the valve is opened. It is also provided with a second similar series of holes 10, which are designed to be brought in alinement with the series of holes 9 when the valve is in its closed position. The rings or flanges 3 are provided with the lugs or projections 11, which seat bolts 12, termed the control bolts, these bolts being for the purpose of holding the flanges in their relative positions while the valve is being turned. When the rings or flanges consist of castings, these lugs 12 may be formed integrally therewith. The rings or flanges may, however, be built up in the manner shown in Fig. 3, in which case the lugs may be provided by brackets 12ª riveted to the rings or flanges and connected by a stiffening plate 13, or otherwise designed for stiffness. The peripheral edge of the valve plate or disk is formed with stop washers 14 bolted to the plate which, by contact with the lugs 11, limit the movement of the valve.

The operation of the valve is as follows:— To open or close the valve, the bolts passing through the holes 8 or 10, and the corresponding holes 9 in the rings or flanges 3 are first removed, the control bolts remaining tight. The control bolts are then loosened and wedges are driven in between the rings or flanges to spring them apart or separate them sufficiently to allow the valve to be moved. Hooked rods or other operating means are then inserted into holes 15, provided in the peripheral portion of the valve plate, and the valve pulled around to the new position until stopped by the engagement of one of the stop projections 14 with one pair of the lugs. The wedges are then taken out, the control bolts tightened, and the bolts through the valve and flanges put in place and tightened.

Instead of separating the rings or flanges 3 by means of wedges, the lugs or projections 11 may, as shown in Fig. 4, be provided with threaded holes to receive studs 16. The threads at the two ends of these studs are made of different pitch as shown, so that by turning the studs the rings or flanges will be forced apart.

The construction described forms a very simple and efficient form of valve of this character, which may be readily placed in a gas main at any desired point.

What I claim is:—

1. The combination with a gas main, of flanges secured to the adjacent ends of the pipe or main sections, and a valve disk centrally pivoted between said rings or flanges exteriorly of the pipe or main and having an opening therethrough adapted to be brought into and out of register with the pipe or main by the movement of the valve, and means for securing the flanges together, the said securing means passing through the valve; substantially as described.

2. The combination with a gas main, of flanges secured to the adjacent ends of the pipe or main sections, and a valve disk centrally pivoted between said flanges exteriorly of the pipe or main and having an opening therethrough adapted to be brought into and out of register with the pipe or main by the movement of the valve, together with means passing through the flanges and valve for securing the valve in its different positions; substantially as described.

3. The combination with a gas main, of flanges secured to the adjacent ends of the pipe or main sections, and a valve disk centrally pivoted between said flanges exteriorly of the pipe or main, and having an opening therethrough adapted to be brought into and out of register with the pipe or main by the movement of the valve, and means for effecting a sufficient separation at a plurality of points on the edge of the flanges to permit movement of the valve; substantially as described.

4. In a valve of the character described, the combination with opposing separated concentric flanges each having a plurality of projecting lugs, control bolts connecting said lugs, a valve disk centrally pivoted between said flanges at the opposite side of said lugs, and means for separating the first mentioned lugs to permit the value or disk to be turned on its pivot; substantially as described.

5. In a valve of the character described, the combination with separated flanges, of a valve disk centrally pivoted between said flanges and having an opening therethrough at one side of the pivot, a plurality of lugs projecting from the edge of each of said flanges at a point opposite the pivotal point of the valve disk, and stop means secured to the disk to engage one or the other of the projecting lugs to limit the movement of the valve; substantially as described.

6. In a valve of the character described, the combination with a pair of opposed separated flanges, of a valve disk centrally pivoted between said flanges and having an opening therethrough at one side of the pivot, said plate also having two series of bolt holes therethrough, either of which series is arranged to be brought into register with corresponding holes in the rings or flanges to clamp the joint and lock the disk in place; substantially as described.

7. A valve for a pipe line comprising adjacent flanged pipes having registered bolt holes in the flanges, a valve disk between the flanges and pivoted on one of the bolts passing through the flanges, the valve having an orifice therethrough to register with the orifices in the pipe, two series of bolt holes in the valve either of which can be brought into register with the bolt holes in the flanges, and bolts passing through the holes in the flanges and the valve disk; substantially as described.

8. A valve for a pipe line, comprising adjacent flanged pipes having registered bolt holes through the flanges, a valve disk rotatably mounted between the pipe flanges, registering bolt holes passing through the flanges on the ends of the pipe and through the disk valve, and bolts passing through the flanges of the pipes and the disk valve; substantially as described.

In testimony whereof, I have hereunto set my hand.

LEONARD SHAW.

Witnesses:
   D. V. MEDALIE,
   W. J. PATTERSON.